(12) United States Patent
Tattrie et al.

(10) Patent No.: US 10,019,239 B2
(45) Date of Patent: *Jul. 10, 2018

(54) SYSTEMS AND METHODS FOR ENHANCING SOFTWARE PRODUCTS THROUGH INTEGRATED DEVELOPMENT ENVIRONMENT RUNNING ON HOST COMPUTER

(71) Applicant: Open Text SA ULC, Halifax (CA)

(72) Inventors: Scott I. Tattrie, Calgary (CA); Trent S. Dinn, Calgary (CA)

(73) Assignee: Open Text SA ULC, Halifax (CA)

( * ) Notice: Subject to any disclaimer, the term of this patent is extended or adjusted under 35 U.S.C. 154(b) by 96 days.

This patent is subject to a terminal disclaimer.

(21) Appl. No.: 15/137,680

(22) Filed: Apr. 25, 2016

(65) Prior Publication Data

US 2016/0239270 A1 Aug. 18, 2016

Related U.S. Application Data

(63) Continuation of application No. 12/396,445, filed on Mar. 2, 2009, now Pat. No. 9,342,272, which is a continuation of application No. 10/938,396, filed on Sep. 10, 2004, now abandoned.

(60) Provisional application No. 60/532,776, filed on Dec. 24, 2003.

(51) Int. Cl.
*G06F 9/46* (2006.01)
*G06F 8/30* (2018.01)
*G06F 8/20* (2018.01)

(52) U.S. Cl.
CPC . *G06F 8/30* (2013.01); *G06F 8/20* (2013.01)

(58) Field of Classification Search
None
See application file for complete search history.

(56) References Cited

U.S. PATENT DOCUMENTS

| | | |
|---|---|---|
| 5,339,423 A | 8/1994 | Beitel et al. |
| 5,752,056 A | 5/1998 | Celik |
| 5,966,512 A | 10/1999 | Bates et al. |

(Continued)

OTHER PUBLICATIONS

Office Action for U.S. Appl. No. 10/938,118, dated Oct. 29, 2007, 32 pgs.

(Continued)

*Primary Examiner* — Wissam Rachid
(74) *Attorney, Agent, or Firm* — Sprinkle IP Law Group

(57) ABSTRACT

A software facility allows custom components to be created and used in an end user application, such as a workflow application that defines business processes or a graphical design application. The facility provides a custom component definition that includes an indication of criteria for custom components for use in the end user application. A designer of the custom component provides the software facility with an indication of functionality for the custom component, wherein the indication satisfies the criteria for custom components included in the provided definition. The custom component is registered with the end-user application. This registration enables the end user application to access the custom component from within the end user application without the use of programming scripts to call the customized component from outside of the end user application.

20 Claims, 11 Drawing Sheets

(56) References Cited

U.S. PATENT DOCUMENTS

| | | | |
|---|---|---|---|
| 6,167,404 | A | 12/2000 | Morcos et al. |
| 6,249,291 | B1 | 6/2001 | Popp |
| 6,330,006 | B1 | 12/2001 | Goodsiman |
| 6,415,259 | B1 | 7/2002 | Wolfinger et al. |
| 6,429,880 | B2 | 8/2002 | Marcos et al. |
| 6,437,805 | B1 | 8/2002 | Sojoodi et al. |
| 6,553,563 | B2 | 4/2003 | Ambrose et al. |
| 6,714,219 | B2 | 3/2004 | Lindhorst et al. |
| 6,714,953 | B2 | 3/2004 | Grubbs et al. |
| 6,745,221 | B1 | 6/2004 | Ronca |
| 6,874,146 | B1 | 3/2005 | Iyengar |
| 6,990,654 | B2 | 1/2006 | Carroll, Jr. |
| 7,017,123 | B2 | 3/2006 | Chickles et al. |
| 7,124,373 | B1 | 10/2006 | Patil |
| 7,134,090 | B2 | 11/2006 | Kodosky et al. |
| 7,159,185 | B1 | 1/2007 | Vedula et al. |
| 7,194,692 | B2 | 3/2007 | Marcos et al. |
| 7,370,315 | B1 | 5/2008 | Lovell |
| 7,424,717 | B2 | 9/2008 | Blevins |
| 7,543,267 | B2 | 6/2009 | Lindhorst et al. |
| 7,984,423 | B2 | 7/2011 | Kodosky et al. |
| 8,095,565 | B2 | 1/2012 | Dengler et al. |
| 8,327,263 | B2 | 12/2012 | Atkinson et al. |
| 8,719,773 | B2 | 5/2014 | Slone |
| 9,329,838 | B2 | 5/2016 | Tattrie et al. |
| 9,342,272 | B2 | 5/2016 | Tattrie et al. |
| 9,395,958 | B2 | 7/2016 | Slone |
| 2001/0045963 | A1 | 11/2001 | Marcos et al. |
| 2002/0029376 | A1 | 3/2002 | Ambrose et al. |
| 2002/0040312 | A1 | 4/2002 | Dhar et al. |
| 2002/0085020 | A1 | 7/2002 | Carroll, Jr. |
| 2002/0133635 | A1 | 9/2002 | Schechter et al. |
| 2002/0165912 | A1 | 11/2002 | Wenocur et al. |
| 2002/0174422 | A1 | 11/2002 | Kelley et al. |
| 2002/0184610 | A1* | 12/2002 | Chong .............. G06F 8/20 717/109 |
| 2003/0093433 | A1 | 5/2003 | Seaman et al. |
| 2003/0167277 | A1 | 9/2003 | Hejlsberg |
| 2003/0172196 | A1 | 9/2003 | Hejlsberg |
| 2004/0083274 | A1 | 4/2004 | Katiyar |
| 2004/0250213 | A1 | 12/2004 | Shalabi et al. |
| 2005/0015746 | A1 | 1/2005 | Shukla et al. |
| 2005/0060684 | A1 | 3/2005 | Gupta |
| 2005/0066304 | A1 | 3/2005 | Tattrie et al. |
| 2005/0091576 | A1 | 4/2005 | Relyea et al. |
| 2005/0262429 | A1 | 11/2005 | Elder et al. |
| 2006/0047665 | A1 | 3/2006 | Neil |
| 2006/0085342 | A1 | 4/2006 | Chen et al. |
| 2006/0123039 | A1 | 6/2006 | Scheuerle |
| 2007/0074121 | A1 | 3/2007 | Mullender et al. |
| 2007/0245302 | A1 | 10/2007 | Grotjohn et al. |
| 2007/0276689 | A1 | 11/2007 | Slone |
| 2008/0189679 | A1 | 8/2008 | Rodriguez et al. |
| 2012/0023064 | A1 | 1/2012 | Ireland |
| 2014/0223411 | A1 | 8/2014 | Slone |

OTHER PUBLICATIONS

Office Action for U.S. Appl. No. 10/938,118, dated May 14, 2008, 27 pgs.

Office Action for U.S. Appl. No. 11/747,888, dated Jul. 16, 2008, 11 pgs.

International Search Report and Written Opinion for International Patent Application No. PCT/US07/68825, dated Jul. 17, 2008, 12 pgs.

Dan, et al., "Web Services on demand: WSLA-driven automated management," IBM Systems, Journal, vol. 43, No. 1, 2004, pp. 136-158.

Office Action for U.S. Appl. No. 10/938,396, dated Sep. 3, 2008, 17 pgs.

Office Action for U.S. Appl. No. 10/938,118, dated Jan. 14, 2009, 19 pages.

International Preliminary Report on Patentability for International Patent Application No. PCT/US07/68825, dated May 14, 2009, 7 pages.

Office Action for U.S. Appl. No. 10/938,118, dated Nov. 3, 2009, 17 pgs.

Examiner's Report for Canadian Patent Application No. 2,443,454, dated Jan. 25, 2011, 6 pages.

Examiner's Report for Canadian Patent Application No. 2,451,164, dated Feb. 16, 2011, 4 pgs.

Office Action for U.S. Appl. No. 12/353,849, dated Jun. 7, 2011, 14 pgs.

Captaris, "Captaris Delivers Workflow Business Solutions," White paper, 2004, pp. 1-8.

Office Action for U.S. Appl. No. 12/353,849, dated Nov. 16, 2011, 21 pgs.

Office Action for U.S. Appl. No. 12/396,445, dated Mar. 13, 2012, 14 pgs.

Office Action for U.S. Appl. No. 12/353,849, dated Mar. 14, 2012, 20 pgs.

Song, Minrong et al., REPOX: An XML Repository for Workflow Design and Specifications, Aug. 26, 2001, 43 pages.

Office Action for U.S. Appl. No. 10/938,118, dated May 8, 2012, 38 pgs.

Examiner's Report for Canadian Patent Application No. 2,443,454, dated Jul. 24, 2012, 6 pgs.

Office Action for U.S. Appl. No. 12/353,849, dated Aug. 22, 2012, 22 pages.

Office Action for U.S. Appl. No. 12/396,445, dated Sep. 28, 2012, 21 pgs.

Office Action for U.S. Appl. No. 10/938,118, dated Oct. 24, 2012, 48 pgs.

Office Action for U.S. Appl. No. 12/353,849, dated Apr. 22, 2013, 19 pgs.

Examination Report for Canadian Patent Application No. 2,451,164, dated Aug. 23, 2013, 4 pgs.

Office Action for U.S. Appl. No. 10/938,118, dated Aug. 28, 2013, 46 pgs.

Office Action for U.S. Appl. No. 12/353,849, dated Sep. 13, 2013, 29 pgs.

Workflow actions quick reference (SharePoint 2013 Workflow platform) SharePoint 2013, received from http://msdn.microsoft.com/en-us/library/jj164026(d=printer).aspx, 8 pages.

Workflow Info Schema and WorkflowActions Schema Overview, May 2010 (updated Feb. 2011), received from http://msdn.microsoft.com/en-us/library/bb897626(d=printer,v=office.14).aspx, printed on Nov. 20, 2012, 3 pgs.

"Plug-in (computing)" retrieved from http://en.wikipedia.org/wiki/Plug-in_(computing), printed Oct. 1, 2013, 7 pages.

Office Action for U.S. Appl. No. 12/396,445, dated Jan. 23, 2014, 9 pgs.

Fry et al., Experiments with OVAL: A Radically Tailorable Tool for Cooperative Work, 1992.

Office Action for U.S. Appl. No. 10/938,118, dated Feb. 25, 2014, 48 pgs.

Office Action for U.S. Appl. No. 12/396,445, dated Dec. 16, 2014, 9 pgs.

Oracle Workflow, Developer's Guide, Release 2.6.3, Sep. 2003, 622 pgs.

"Add/remove a shared assembly to/from the .net Gac," TheScarms.com, Oct. 28, 2003, retrieved from <http://www.thescarms.com/dotnet/GacUtil.aspx>, 2 pgs.

Joshi, Bipin, "Introduction to .NET Reflection," BinaryIntellect, Jun. 10, 2001, retrieved from <http://www.binaryintellect.net/articles/90c953d1-134c-4ecb-ab5f-5462029cdde4.aspx>, 6 pgs.

Examination Report for Canadian Patent Application No. 2,451,164, dated Dec. 2, 2014, 4 pgs.

Malone et al., "Experiments with Oval: a radically tailorable tool for cooperative work," Proceeding CSCW '92 Proceedings of the 1992 ACM Conference on Computer-supported cooperative work, pp. 289-297.

Office Action for U.S. Appl. No. 10/938,118, dated Mar. 2, 2015, 48 pgs.

(56) References Cited

OTHER PUBLICATIONS

Office Action for U.S. Appl. No. 10/938,118, dated Jul. 15, 2015, 46 pgs.
Office Action for U.S. Appl. No. 14/245,583, dated Jul. 24, 2015, 16 pgs.
Office Action for U.S. Appl. No. 14/245,583, dated Dec. 30, 2015, 24 pgs.
Notice of Allowance for U.S. Appl. No. 14/245,583, dated May 16, 2016, 10 pgs.

* cited by examiner

SYSTEMS AND METHODS FOR ENHANCING SOFTWARE PRODUCTS THROUGH INTEGRATED DEVELOPMENT ENVIRONMENT RUNNING ON HOST COMPUTER

CROSS-REFERENCE TO RELATED APPLICATION(S)

This application is a continuation of U.S. patent application Ser. No. 12/396,445, filed Mar. 2, 2009, now U.S. Pat. No. 9,342,272, entitled "CUSTOM AND CUSTOMIZABLE COMPONENTS, SUCH AS FOR WORKFLOW APPLICATIONS," which is a continuation of U.S. patent application Ser. No. 10/938,396, filed Sep. 10, 2004, abandoned, entitled "CUSTOM AND CUSTOMIZABLE COMPONENTS, SUCH AS FOR WORKFLOW APPLICATIONS," which claims priority from U.S. Provisional Application No. 60/532,776, filed Dec. 24, 2003, all of which are incorporated by reference herein. This application relates to U.S. patent application Ser. No. 10/938,118, filed Sep. 10, 2004, now allowed, which is incorporated by reference herein and which also claims priority from U.S. Provisional Application No. 60/532,776, filed Dec. 24, 2003. This application also claims priority to commonly owned Canadian Patent Application No. 2,451,164, entitled "CUSTOMIZABLE COMPONENTS," filed Sep. 11, 2003, which is incorporated by reference herein.

BACKGROUND

Software is often divided into two categories: system software, which includes the operating system (e.g., Windows 95, MacOS) and all utilities that enable a computer or network of computers to function; and applications software, which includes programs that perform specific tasks (e.g., word processors, spreadsheets, databases, organizational tools, workflow applications, etc.).

There are many developers of applications software that produce a wide range of specialized and powerful software products that are highly functional right "out-of-the-box." However, it is impossible to predict the needs of all software users, resulting in a need for applications software with custom or customizable features.

One way that applications software may be customized is by accessing the application's source code so that functionality (e.g., in the form of components or other features) can be added to the existing application. However, because off-the-shelf applications are often distributed in object code, the corresponding source code is not available. Moreover, as applications software continues to become increasingly complex, modifications to source code may be extremely challenging, even for the developers of the software itself.

In response to the need for customizable applications software, many developers are offering software that contemplates all possible functions that an end user may desire. While this approach has generally improved the range of functionality available in most software applications, it is an expensive solution and still does not offer the type of customization that many users desire.

Another approach to customizing software involves using external programs to enhance an application's functionality. Accordingly, many application developers are offering software that accommodates plug-ins and other simple external programs (such as programs written using a scripting language). While enhancing an application in this way may help to expand its functionality, such techniques are typically limited by the existing core functionality of the software application. In some cases, creating and integrating external code into an application may require high-level programming knowledge to ensure that the external program can communicate effectively with the primary application.

Figure 1:
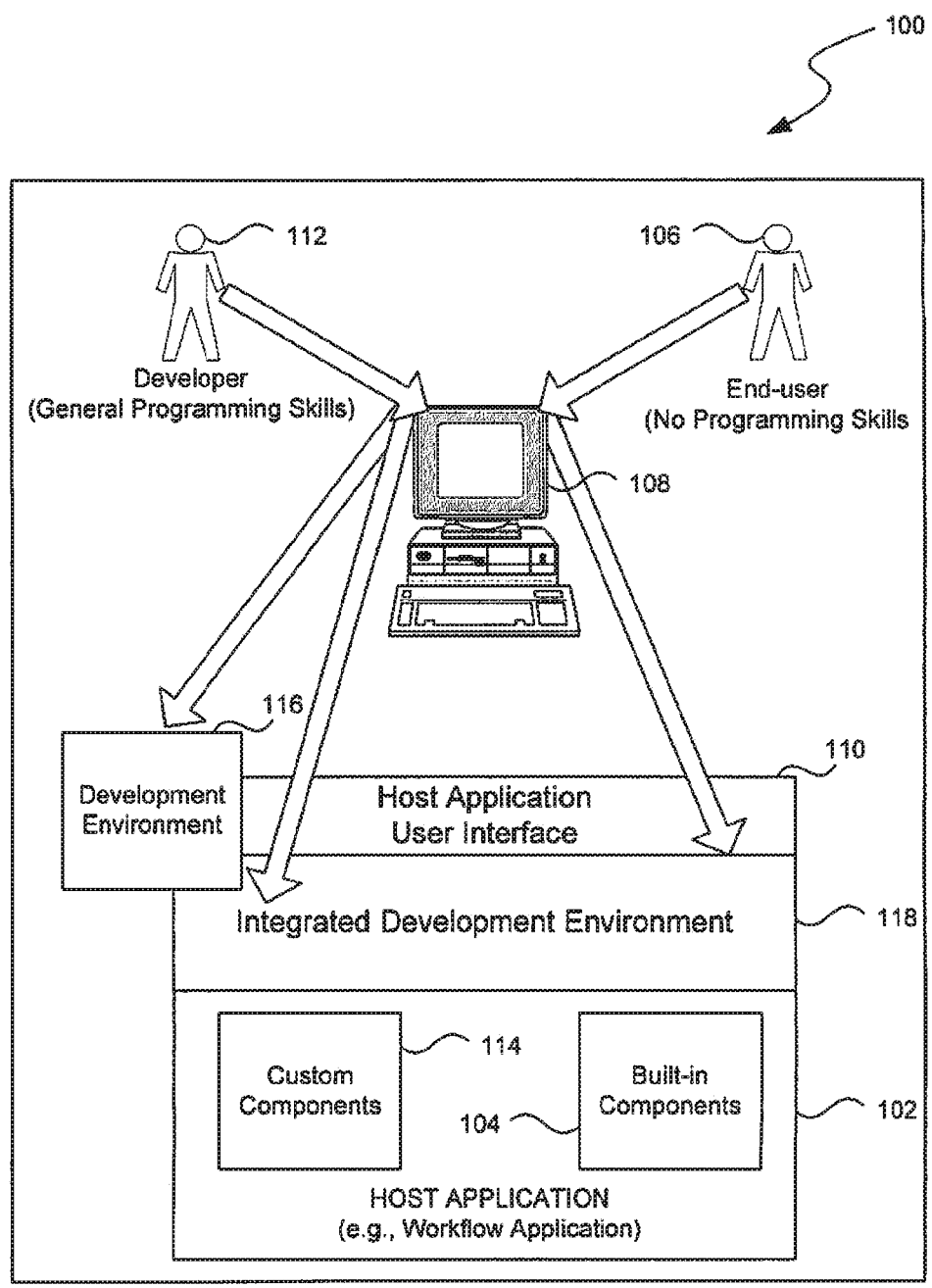
FIG. 1 is a block diagram showing an example of an environment for creating and using custom and customizable components under one embodiment of the invention.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

A portion of this disclosure contains material to which a claim for copyright is made. The copyright owner has no objection to the facsimile reproduction by anyone of the patent document or patent disclosure (including Figures), as it appears in the Patent and Trademark Office patent file or records, but reserves all other copyright rights whatsoever.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. OVERVIEW

A software facility provides a framework that enables a programmer with limited skills to add functionality to a host application, such as an end user application (e.g., workflow application, graphics application, word processing application, data management application, etc.). In this way, the host application may be enhanced and customized to suit the needs of an end user.

In general, the software facility also provides a method and system for expanding the functionality of the host application via the use of custom or customizable components, which can easily be incorporated into the host application, even by a programmer with limited programming skills. In some embodiments, the software facility allows the programmer to create and incorporate a custom component into the host application without accessing source code of the host application, without reliance on programming scripts to call the custom component from outside the host application, and without calling any external application. Furthermore, the software facility allows the addition of new core components (as opposed to only allowing enhancements of existing components) and does so without modifying encapsulated functionality of the host application.

While the host application may have various built-in capabilities, certain custom components may be desired, such as a custom action that allows an end user to initiate automatic communications with a specified supplier as part of a workflow model. Accordingly, a programmer with limited skills may create such a custom component and seamlessly incorporate it into the host application for repeated use by the end user (e.g., using drag-and-drop functionality). Thus, in one embodiment, the software facility also provides a standard interface to allow end users to build workflow models using a provided collection of components. For example, a user may build a complex workflow by dragging and dropping the provided components into a design area, where they automatically snap together. This is made possible because the provided components are configured to "describe themselves" relative to other components used in the workflow model.

In another example, the host application is a graphics application or drawing program that lacks a tool for easily drawing local maps. In this example, the custom component may be a local map drawing tool that adds new core functionality to the graphics application or drawing program. A more complex example of a custom component in the context of a graphics application or drawing program may be a tool that distributes a thumbnail of a graphic to a predefined group of companies interested in purchasing electronic art and automatically completing a licensing transaction with an interested buyer based on a price and terms predefined by the end user.

The software facility provides a custom component definition that allows a programmer to easily incorporate a custom component that he or she builds into the host application. The custom component definition provides standard criteria (e.g., rules, definitions, naming conventions, etc.) for all custom components for use in the host application.

Once the custom component is created based on the custom component definition, it can be registered or otherwise incorporated into the host application so that end users may have access to the custom component. For example, in one embodiment, the host application is a workflow application that allows end users to define and track the flow of work between individuals and/or groups.

In addition to creating new custom components, existing (e.g., built-in) components may be modified using similar techniques.

II. REPRESENTATIVE SYSTEM

FIG. 1 and the following discussion provide a brief, general description of a suitable environment in which the invention can be implemented. Although not required, aspects of the invention are described in the context of computer-executable instructions, such as routines executed by a computer (e.g., a server computer, wireless device, or personal/laptop computer). Those skilled in the relevant art will appreciate that the invention can be practiced with other communications, data processing, or computer system configurations, including Internet appliances, hand-held devices (including personal digital assistants (PDAs)), wearable computers, all manner of cellular or mobile phones, embedded computers (including those coupled to vehicles), multi-processor systems, microprocessor-based or programmable consumer electronics, set-top boxes, network PCs, mini-computers, mainframe computers, and the like.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communication network. In a distributed computing environment, program modules may be located in both local and remote memory storage devices.

Aspects of the invention may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the invention reside on a server computer, while corresponding portions reside on a client computer, such as a mobile device.

Referring to FIG. 1, a typical environment 100 in which the software facility operates includes a host application 102. For illustrative purposes, the host application 102 in the illustrated embodiment is a workflow application, but the invention may be implemented in the context of almost any type of applications software. The host application 102 in the illustrated embodiment provides a set of "built-in" or default components 104 (e.g., workflow objects, data objects, resource objects, actions, etc.). Examples of such built-in components are provided with respect to FIGS. 4 and 5. An end user 106 accesses the host application 102 via a computer 108, which displays an application user interface 110 on a screen or other output device.

The host application 102 is configured so that a developer 112 can enhance its functionality by designing one or more custom components 114 via a development environment 116 (e.g., Microsoft Visual Studio .NET) that provides some integration with the host application through an integrated development environment 118. Once the developer 112 creates such custom components 114 and integrates them into the host application 102, the end user 106 may access the custom components 114 via the computer 108 and application user interface 110, as he or she would access the built-in components 104.

III. SAMPLE USER INTERFACE

Referring to FIGS. 2 through 8, representative computer displays or web pages will now be described with respect to using components and creating custom components in an exemplary workflow application. The screens of FIGS. 2 through 8 may be implemented in C# as web pages under XML (Extensible Markup Language), HTML (HyperText Markup Language) or any other scripts or methods of creating displayable data, such as the Wireless Access Protocol ("WAP"). The screens or web pages provide facilities to receive input data, such as a form with fields to be filled in, pull-down menus or entries allowing one or more of several options to be selected, buttons, sliders, hypertext links, or other known user interface tools for receiving user input. While certain ways of displaying information to users are shown and described with respect to certain Figures, those skilled in the relevant art will recognize that various other alternatives may be employed. The terms "screen," "view," and "page" are generally used interchangeably herein.

When implemented, the screens may be stored as display descriptions, graphical user interfaces, or other methods of depicting information on a computer screen (e.g., commands, links, fonts, colors, layout, sizes and relative positions, and the like), where the layout and information or content to be displayed on the page is stored in a database. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

FIGS. 2 through 8 show sample screens from a workflow application, which is used here as an example of the host application 102 of FIG. 1. The workflow application of this illustrated embodiment permits users to define and track business processes, such as the flow of work between individuals and/or groups in, for example, an organization or industry. Many of the sample screens illustrated below correspond with aspects of an integrated development environment associated with the workflow application, such as the integrated development environment 118 of FIG. 1.

Figure 2A:
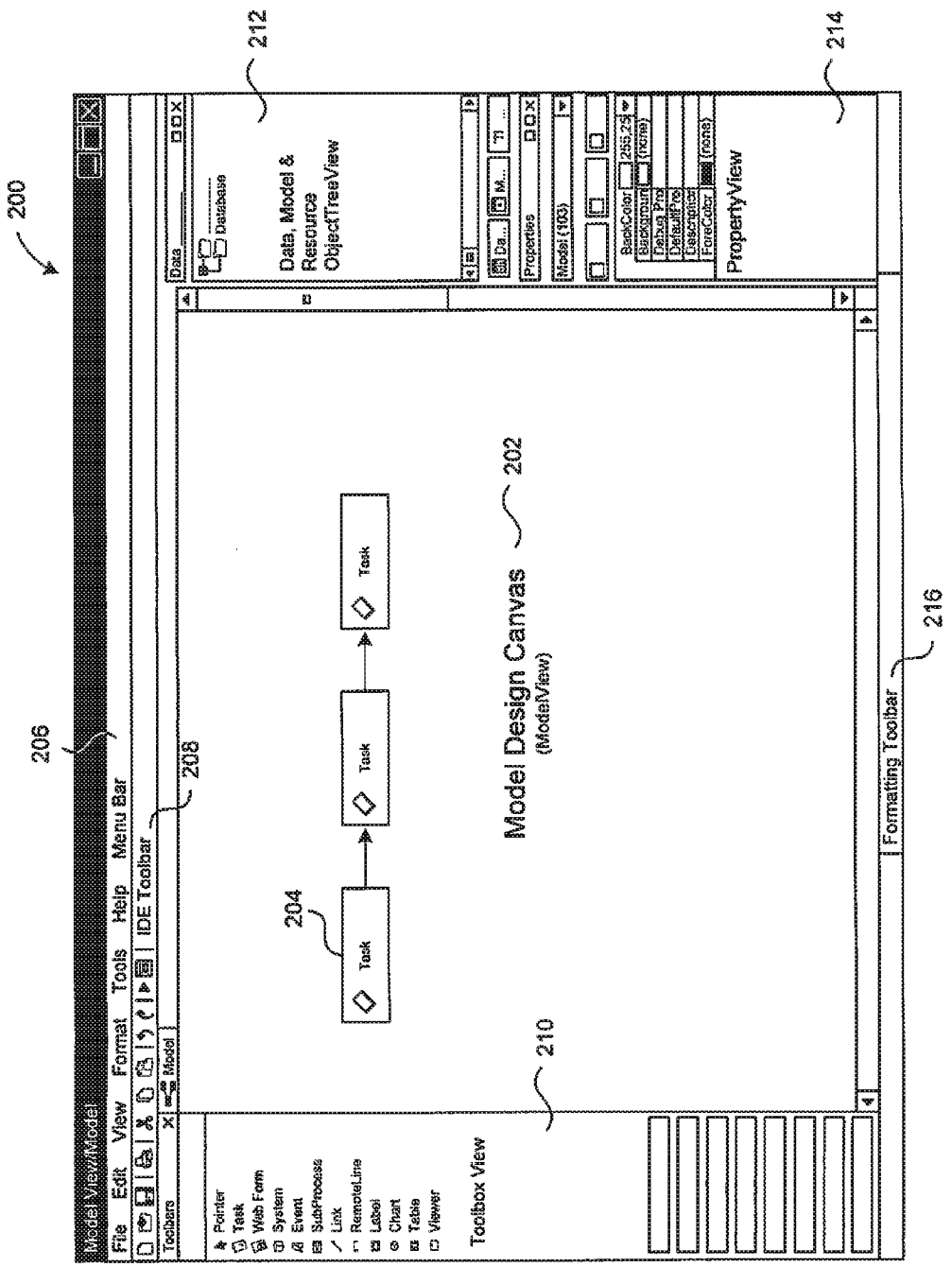
FIG. 2A is a display diagram showing an example of a model view for the host application of FIG. 1.

Referring to FIG. 2A, a model view 200 of the workflow application includes a design view 202 (e.g., model design canvas) that provides a workspace where a user can design a high-level workflow model using custom or built-in workflow components (e.g., workflow objects, data objects, resource objects, actions, etc.). For example, the user can arrange workflow objects, such as tasks 204, in the design view 202 to build a business process. In the illustrated embodiment, the model view 200 also includes a menu bar 206, an integrated development environment tool bar 208, a toolbox view 210, an object tree view 212, a property view 214, and a formatting tool bar 216.

In the illustrated embodiment, the toolbox view 210 is part of an integrated development environment and contains four panels containing various forms, objects, utilities, and wizards used in designing a workflow model. The toolbox view may have one or more tabs, such as a workflow tab, a form tab, a web form tab, and an actions tab. Clicking on one of these tabs may display a corresponding specialized toolbox. Alternatively, the appropriate specialized toolbox may be displayed automatically, depending on the user's activities. For example, if a user is working on a form in the design view 202, the form toolbox may be automatically displayed.

The object tree view 212 provides access to all resource objects within a model. For example, the object tree view 212 may provide a folder structure for the currently displayed or open Workflow Model. A Folder within the object tree view 212 may represent one of the types of component associated with the application (e.g., workflow object, data object, resource object, action, etc.).

The property view 214 is part of the integrated development environment and emulates a development environment, such as Microsoft's Visual Studio .NET.

Figure 2B:
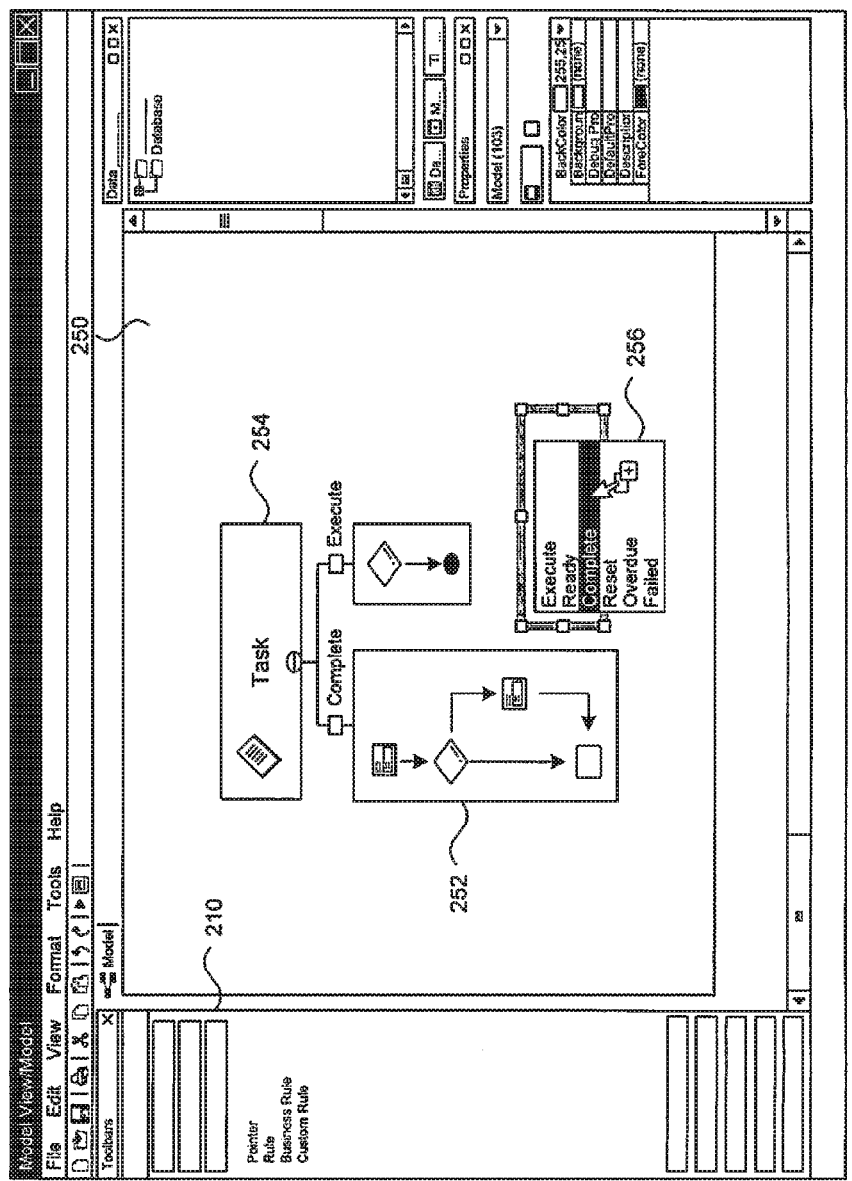
FIG. 2B is a display diagram showing an example of an action view for the host application of FIG. 1.

The model view 200 may also include access to an action view, such as an action view 250 illustrated in FIG. 2B. The action view 250 may be part of the integrated development environment and may involve displaying an action 252 (e.g., complete) as it relates to a workflow component, such as a task 254. As part of the action view 250, a pop-up menu 256 may automatically appear when a user attempts to add an action to a workflow object (e.g., by accessing an action from the toolbox view 210). In some embodiments, the action view can be collapsed or expanded on the design view 202.

The action view 250 may be considered a visual representation of a script view (not shown). The script view allows the user or developer to view script that the workflow application generates based on the model that the user creates. In general, script refers to text or code corresponding to a model or form. The script specifies and otherwise controls the activities of the model of form. Accordingly, for each workflow model, there may be a corresponding script view. In addition, each form and web form that exists within the model may have its own script view. The particular scripting language that is used may relate to an associated development environment, such as Microsoft Visual Studio .NET.

In some embodiments, the script view may also be used to extend a model's (or form's) functionality, as is described in more detail below. One way to implement this capability may be by incorporating an Intellisense feature found in the Microsoft Visual Studio development environment into the host application's integrated development environment.

Figure 3:
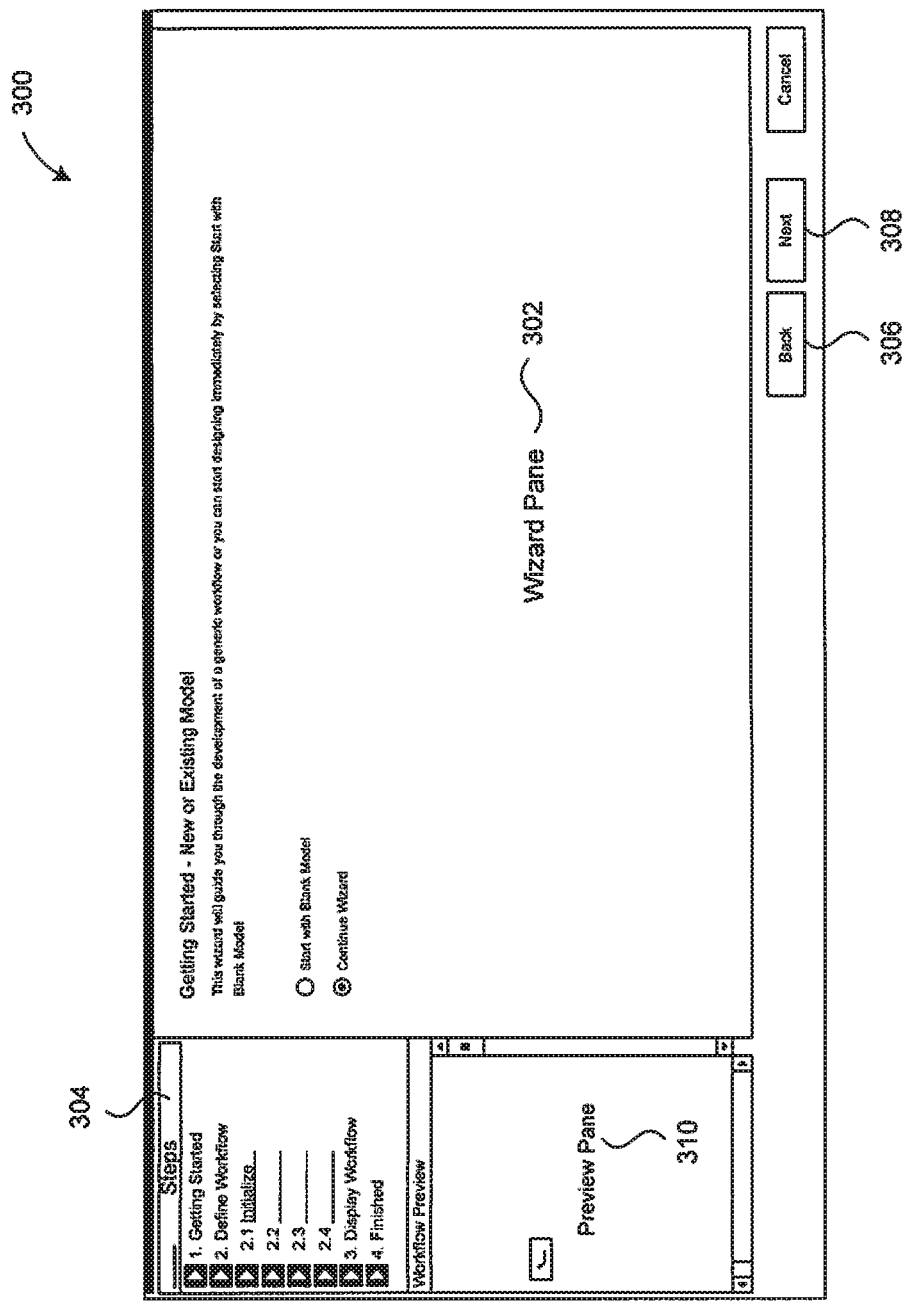
FIG. 3 is a display diagram showing an example of workflow model wizard for the host application of FIG. 1.

Referring to FIG. 3, the workflow application of the illustrated embodiment may include a model wizard 300 that helps a user with limited skills to build a new workflow model using workflow objects, other components (see FIGS. 4 and 5), and business logic. In some embodiments, the model wizard 300 starts automatically when a user requests to create a new model.

In the illustrated embodiment, the model wizard 300 has two user options that are illustrated in a wizard pane 302. The first option allows a user to start with a blank model. With a blank model, the model wizard 300 places the user in an integrated development environment with a blank design area similar to the design view 202 of FIG. 2A. The second option allows the model wizard 300 to guide the user through various steps of creating a new workflow model. Examples of such steps are illustrated in a steps pane 304. In this way, the model wizard 300 helps the user to generate a visual representation of his or her workflow so that the workflow application can create a corresponding script.

As the user progresses through the steps of the model wizard 300, the steps in the steps pane 304 may be "ticked," meaning that a visual indicator is provided that a step has been completed. In some embodiments, users can navigate through the model wizard 300 using a back button 306 and a next button 308. The user may click hyperlinks in the steps pane 304 to proceed to a next step. A preview pane 310 displays a representation of the workflow model in progress as the user advances through each step of the model wizard 300. The wizard pane 302 displays the contents of each step, including the selections the user makes as he or she progresses through the model wizard 300.

Some of the steps that a user performs using the model wizard 300 may include the following: defining a name for a model and associating an image with the model: defining tasks for the model (e.g., number of tasks, type of each task, responsible user(s) for the task, email notifications for the tasks, etc.); defining links and rework links used to connect tasks in the model; creating or importing forms or web forms for the tasks in the model; creating business rules or workflow logic for the links and rework links connecting the tasks; and defining directory and server names for deploying forms.

Figure 4:
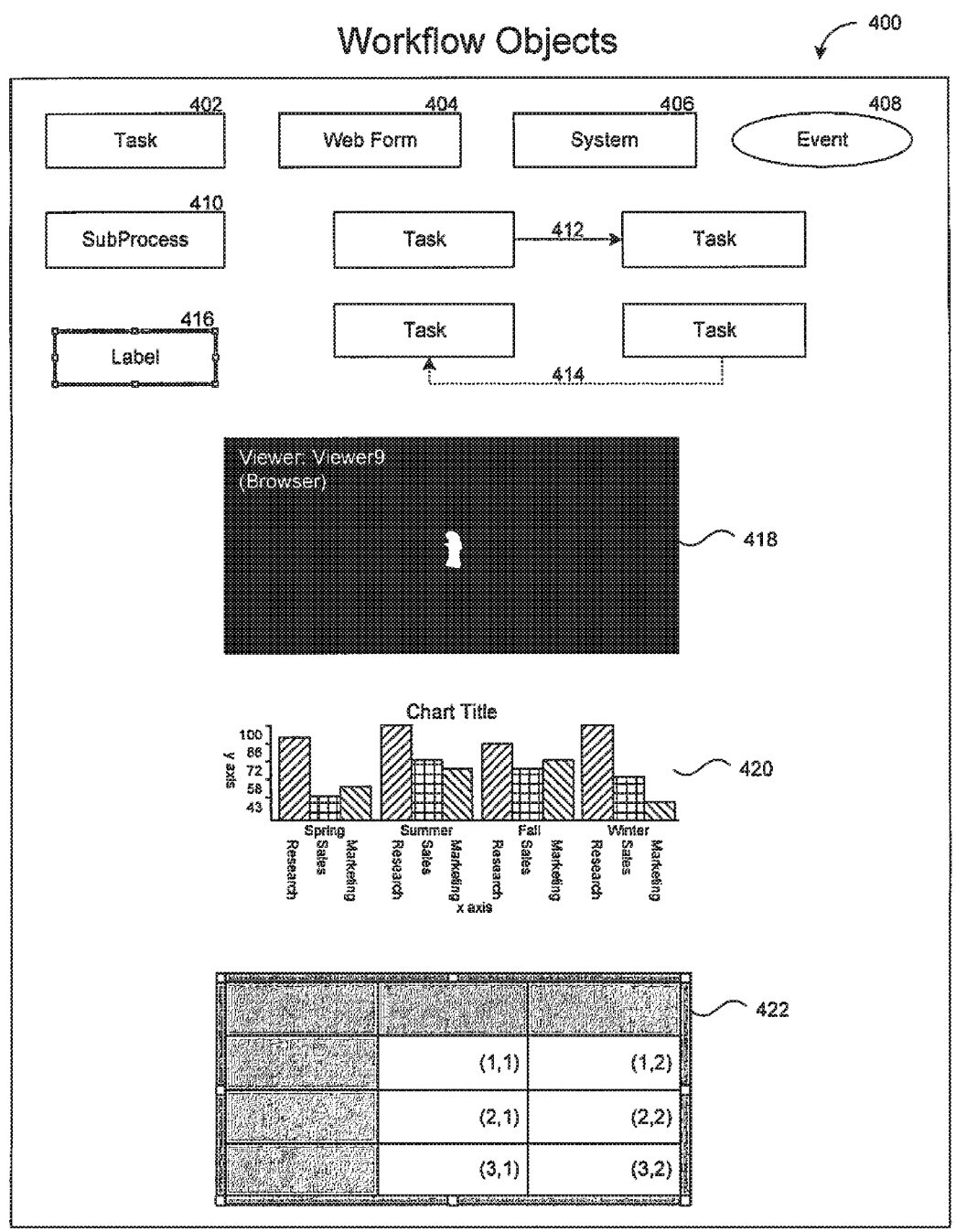
FIG. 4 is a display diagram showing an example of a collection of workflow object components for the host application of FIG. 1.
Figure 5:
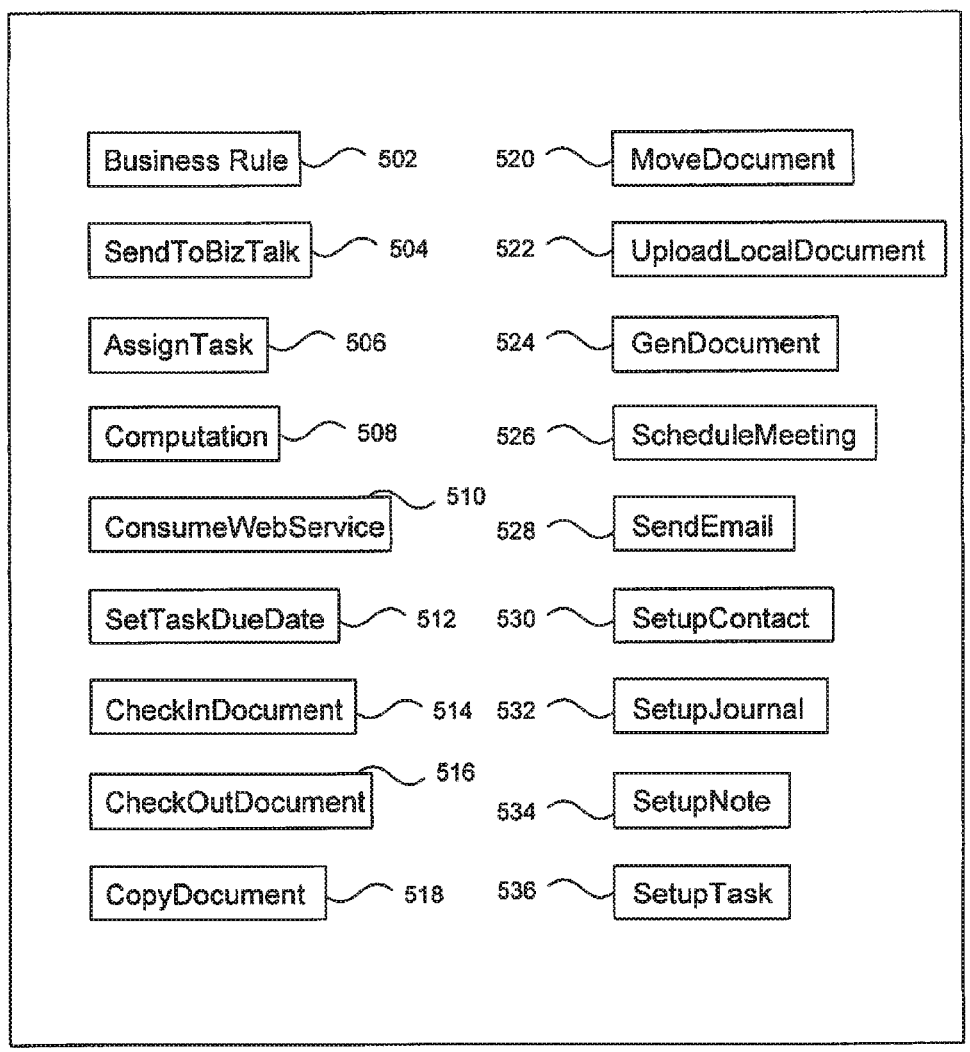
FIG. 5 is a display diagram showing an example of a collection of action components for the host application of FIG. 1.

The user of the workflow application may use various built-in components and custom components to create workflow models, such as the built-in and custom components of FIGS. 1 (104 and 114, respectively). From the perspective of the end user, such components may be introduced into a model design canvas, such as the design view 202 of FIG. 2, using "drag-and-drop" and/or "snap-on" functionality. Examples of built-in components provided by the workflow application include workflow objects, data objects, resource objects, and actions. Examples of workflow objects and actions are illustrated in FIGS. 4 and 5, respectively. While not illustrated, examples of data objects include database objects and XML objects. Examples of resource objects include forms, web forms, documents, and images. The possibilities for custom components are almost limitless and are therefore not illustrated as part of a collection. However, examples of creating custom components are illustrated in FIGS. 6-10.

Referring to FIG. 4, components of the workflow application, such as the workflow application of FIGS. 1-3, may include a collection 400 of workflow objects. A task 402 is the basic workflow object used to model one step of a workflow. A web form 404 is a form generally used when the user knows that the primary user interface for gathering and viewing data is a web browser. A system workflow object 406 is a special task that is automatically executed by the workflow application without the need for any user interaction or initiation. An event workflow object 408 is some action that is performed by an object. It is often associated with a task. A subprocess workflow object 410 is a type of task used to call another process from within a process.

Workflow objects may also include objects that link multiple components, such as a link workflow object 412 that is a connection between tasks that defines the flow of work and a rework link workflow object 414 that allows the work to flow backwards in the process, thereby allowing a task to be reworked or allowing the model to backtrack to previously executed tasks.

A label workflow object 416 is an object used to display information on the workflow view. A viewer workflow object 418 is an object used to display a document, a web page, or media in a workflow model. A chart workflow object 420 is an object used to graphically display the relationship between objects in the workflow such as a pie chart or bar chart. A table workflow object 422 is an object used to display data in a tabular format.

Referring to FIG. 5, in addition to components such as the workflow objects described above, the workflow application may also provide the user with access to actions. In general, actions added to a workflow application may assist users in creating frequently used functions on workflow models. In the illustrated embodiment, each action has an easy-to-use interface that can include one step or multiple steps.

A BusinessRule action 502 helps the user to add a rule or expression based on workflow logic and associates the rule to a workflow object. In general, business rules are used to determine if a link or rework link is to be executed. Business rule expressions are also used to control conditional branching within a model. A SendToBizTalk action 504 helps the user create the methods and structure needed to pass data from a process in his or her workflow model to a Microsoft BizTalk server that is capable of receiving documents or data from a number of different platforms and applications. In general, the Microsoft BizTalk server is used to integrate and automate data flow with and between organizations. In the illustrated embodiment, the SendToBizTalk action 504 provides additional functionality to interact with the Microsoft BizTalk server by sending data from a process.

An AssignTask action 506 allows the user to assign or reassign a task in the workflow based on a specific user or group. A Computation action 508 allows the user to add a computation or calculation to an event on a workflow object. A ConsumeWebService action 510 allows the user to consume a web service for a workflow object. A web service is an application that is delivered over the Internet and resides on a web server. Web services are useful for software integration that exists on foreign platforms. A SetTaskDueDate action 512 allows the user to add an absolute or relative due date to the workflow object.

A CheckInDocument action 514 allows the user to check in a document or file into a share point document library and associate it to a workflow object. A CheckOutDocument action 516 allows the user to check out a document or file from a share point document library and associate it to a workflow object. A CopyDocument action 518 allows the user to copy a document or file from one share point document library to another and associates it with a workflow object. A MoveDocument action 520 allows the user to move a document or file from one share point document library to another and associate it to a workflow object. An UploadLocalDocument action 522 allows the user to upload a document from a local machine to a share point document library and associate it to a workflow object. A GenerateDocument action 524 allows the user to generate a document and associate it to a workflow object, allowing documents to be automatically composed. Such documents are typically templates with merge fields that are created and then imported into the workflow application. With the GenerateDocument action 524, the merge fields of the templates are bound to the corresponding elements or notes in an XML data object.

A ScheduleMeeting action 526 allows the user to add a meeting request that may be recognized by a calendar program and associate it to a workflow object. Through this action, the user can schedule the meeting start and end dates and time as well as resources and send a notice to attendees. A SendEmail action 528 allows the user to construct an email message and associate it to a task workflow object. A SetupContact action 530 allows the user to add a contact to a calendar program contact folder and associate it to a workflow object. In some embodiments, this action includes all the contact information fields that the calendar program uses when creating a new contact. A SetupJournal action 532 allows the user to add a journal entry into a calendar or journal program and associate it to a workflow object. A SetupNote action 534 allows the user to add a note into a notes folder of a calendar or journal program and associate it to a workflow object. A SetupTask action 536 allows the user to add a task into a task list folder of a calendar or journal program and associate it to a workflow object. The SetupTask action 536 may include all the task information fields used by the calendar or journal program when creating a new task.

Thus, as shown in FIGS. 4 and 5, the workflow application may supply the user with a wide variety of built-in components, including workflow objects, data objects, resource objects, and actions to use in the development of a model. However, every development scenario is different and may demand a level of customization or integration that is not provided by the application "out-of-the-box." To provide for this type of situation, the workflow application may be configured for enhancement via the use custom components, such as the custom components and/or actions 114 of FIG. 1. A developer or other user with general programming skills may create such custom components in an integrated development environment, such as the integrated development environment 118 of FIG. 1. In this way, the developer can create one or more custom components that provide additional functionality that an end user can use to develop workflow models. As with the built-in components of FIGS. 4 and 5, the custom components may also provide "drag-and-drop" and/or "snap-on" functionality to make things easy for the end user.

In some embodiments, the integrated development environment may facilitate the developer's ability to reuse previously created code. It may also allow the developer to create custom components without having to adapt script or write large amounts of code. Instead, the developer adds functionality to the workflow application by simply adding custom actions (created in the standard development environment) to the toolbox view of the workflow application. Thus, the custom action creation process provides a developer with the ability to create and customize repetitive code while reducing the risk of "human error" when script is copied or pasted or entered manually with errors. For example, once incorporated into the host application's toolbox, a single custom action can be used with several workflow objects within one workflow model or used in multiple workflow models. In some embodiments, custom components are built on the Microsoft .NET framework using development tools such as Visual Studio .NET and thereby compile to .NET assemblies. Once these assemblies are placed in the global assembly cache, they are available to all workflow processes and allow for significant reuse.

In some embodiments, the developer may also be able to modify script of built-in or custom action using the graphical environment provided by the model and action views. For example, as actions are viewed by displaying an action view pop-up for the object, the developer can edit the action by double-clicking on it and accessing associated script (e.g., via the script view). The action is displayed, and when the developer clicks on the finish button, the script is automatically updated.

In some embodiments, the workflow application can also integrate with third party products by using or calling a third party application's exposed API within a component's script view, thereby invoking the third party product as part of a workflow application.

In general, to create and implement a custom component the developer creates the code and interface for the custom component. So that the custom component can be easily implemented into the host application, the developer creates the custom component in accordance with a provided set of definitions or criteria, and then registers it with a global assembly cache in the host application. After that, the developer can add the custom component to the host application by following a designated procedure. In the context of the workflow application of the illustrated embodiment, this procedure involves right-clicking on the toolbox view of the host application and selecting customized toolbox from the shortcut menu. These steps are described in more detail with respect to FIG. 6 through 8.

Figure 6:
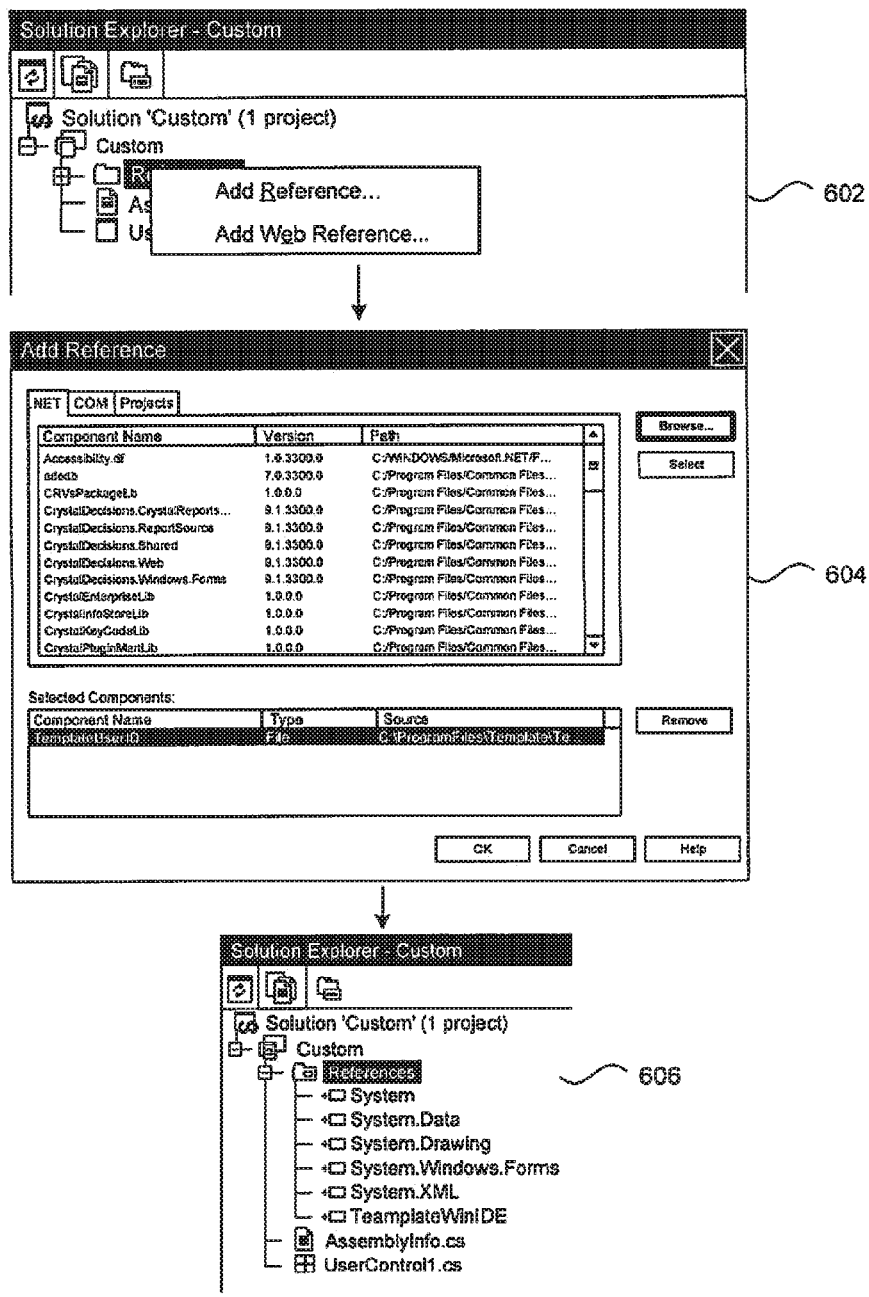
FIG. 6 is a display diagram showing steps for adding a workflow application reference to a custom component project in a development environment.

FIG. 6 shows steps for adding a workflow application reference to a custom component project in a development environment. In the illustrated embodiment, which is implemented in part using Microsoft Visual Studio .NET, these steps occur after the developer has created an initial Windows control library project for the custom component. At block 602, from the Windows control library project for the custom component, the user displays a Solution Explorer screen by clicking on a Solution Explorer tab and the project name. By right-clicking on a References node and selecting Add Reference from a displayed shortcut menu, the developer opens a dialog box 604. From the dialog box 604 the developer selects an appropriate file from a Components list. For example, the file may be a .dll file (related to a Windows dynamic-link library). In the illustrated embodiment the selected file is associated with the workflow application's integrated development environment. The completion of this step results in the workflow application reference being added under the References node of the Solution Explorer as shown in block 606.

After the workflow application reference is incorporated into the development environment project, the developer can develop the custom component and its associated interface using features provided by the workflow application as well as custom code written in a programming language such as C#.

Figure 7:
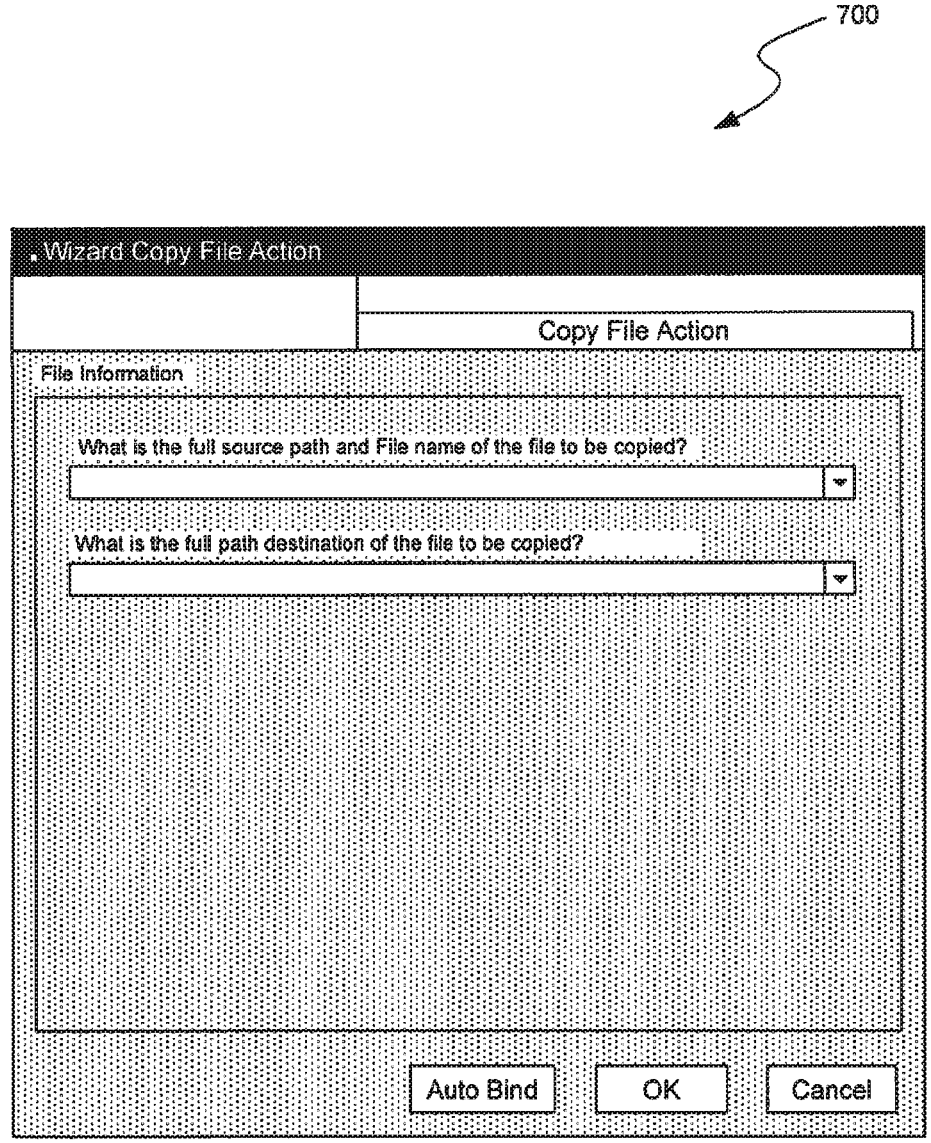
FIG. 7 is a display diagram showing a custom component interface created in a development environment.
Figure 8:
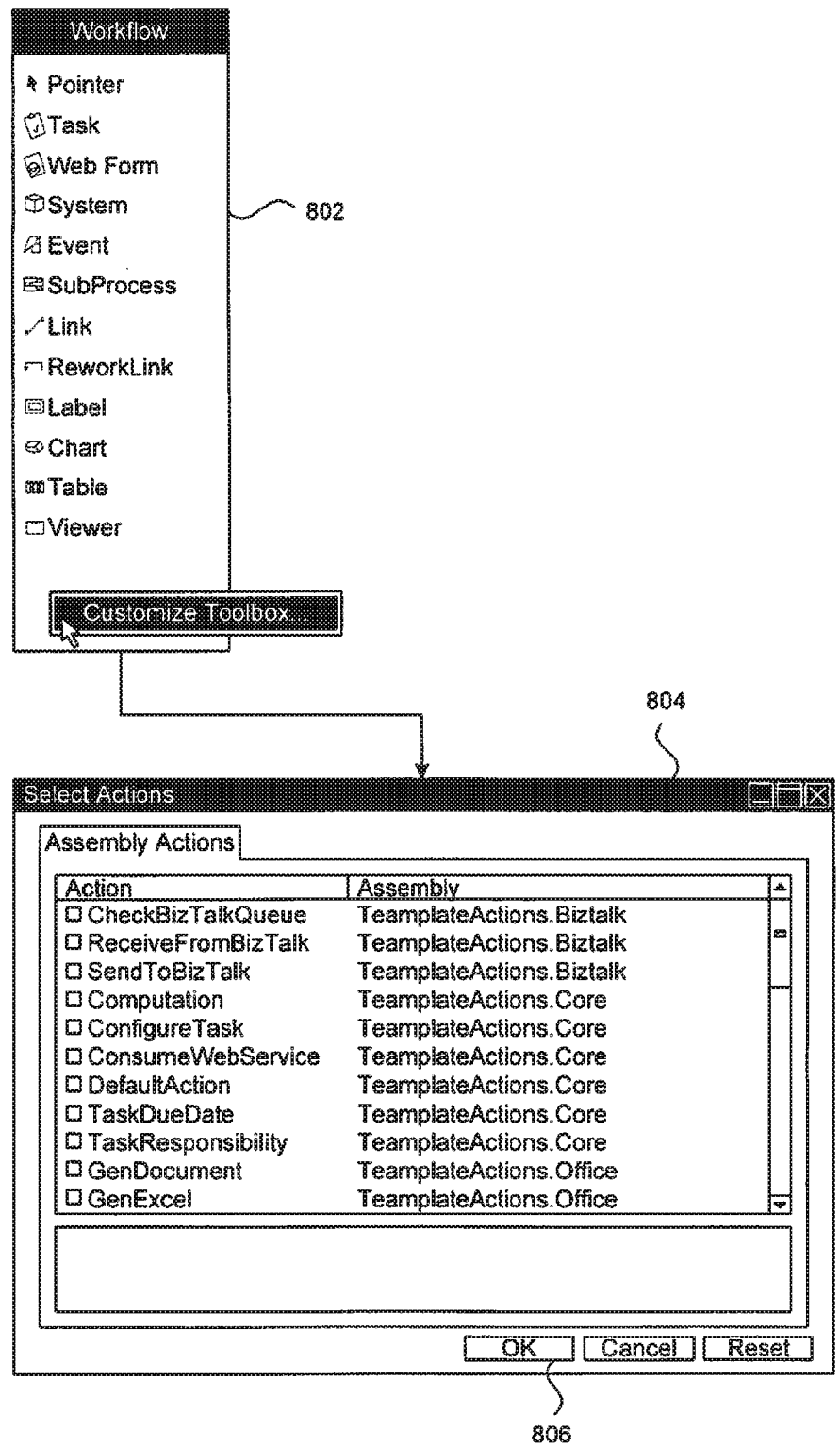
FIG. 8 is a display diagram showing steps for adding a custom component to a toolbox view for the host application of FIG. 1.

FIG. 7 shows a custom action interface created in a development environment. The developer does this by selecting his or her custom component from the Solution Explorer of the development environment and selecting an Add New Windows Form option from a displayed submenu. From an Add New Item Dialog box, the user selects Windows Form from the list and clicks an Open button. The user then creates a custom component interface such as an interface 700 depicted in FIG. 7. In this particular example, the user has implemented the interface using a combo box control. In some embodiments, this involves a developer writing code to implement the various fields and aspects of the interface.

In the illustrated embodiment, the functionality that defines how the custom component interacts within the integrated development environment and controls the display of the custom component in the toolbox view of the workflow application may be defined by implementing one or more stub functions. The workflow applications provide a shell or structure for such stub functions, which are then implemented using custom code provided by the developer. While not shown, the various stub functions may include the following: An action image function controls or determines the image that is displayed for the custom action in the toolbox view, as well as the icon that is displayed in the action view pop-up. A display wizard stub function passes an XML parameter into the custom component. This XML parameter may be a description of the custom action that is being built.

An execute stub function executes the custom action in the integrated development environment. In some embodiments, this is a static function. An execute parameter stub function returns a string of parameter definitions for the execute stub function in some embodiments. A return parameter stub function returns a value and determines where the values are to be stored. A save XML action stub function is used to save an XML string description of the custom component. This XML string is then passed into a display wizard subfunction.

After defining and implementing the code and interface aspects for the custom component, the developer builds and/or compiles the custom component project from within the development environment. At some point, the developer may assign an identifier name to the custom component so that it can be accessed from the workflow application. For example, in the case of a Microsoft ASP.NET framework, the developer may assign a strong name to the custom component. A strong name consists of an indication of the custom component's identity, which may include the custom component's simple text name, version number, etc., which is strengthened by a public key and a digital signature generated over the custom component. A manifest associated with the custom component may contain file hashes for all the files that constitute the assembly implementation. In the illustrated embodiment, custom components with the same strong name are expected to be identical.

Once the custom component project is built and/or compiled, the developer registers the custom component in a data store associated with the workflow application. In the case of a Microsoft ASP.NET framework, the data store may be a global assembly cache associated with the workflow application. In general, the global assembly cache contains assemblies (such as custom components) that are explicitly installed to be shared among many applications on the computer. In some cases, the registration step may involve simply dragging and dropping a file associated with the custom component into an appropriate assembly folder associated with the workflow application.

The next step is to add the custom component to the toolbox view of the host application. The steps for this are illustrated in more detail in FIG. 8. The developer begins at block 802 by selecting a customized toolbox option from a shortcut menu for the toolbox. This results in a display of a Select Actions dialog box 804. From this dialog box, the developer clicks on a checkbox corresponding to any custom component that the developer would like to include in the toolbox view. (This assumes that the custom component was in fact registered with the global assembly cache as described above—as only registered custom components are displayed in the dialog box.) Once the user clicks an OK button 806, the selected custom components are then added to the toolbox view for use by end users. In the illustrated embodiment, custom components can later be removed from the toolbox view by un-checking components in the Select Actions dialog box.

IV. SYSTEM FLOWS

Figure 9:
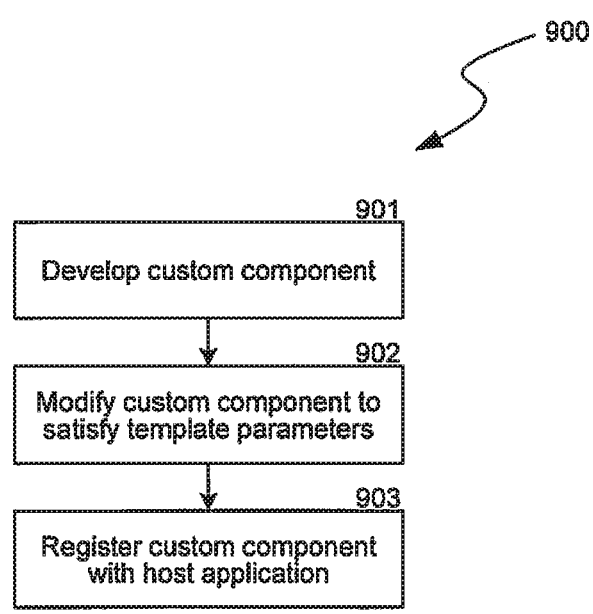
FIG. 9 is a flow diagram showing an example of a routine for developing and implementing a custom component in the host application of FIG. 1.
Figure 10:
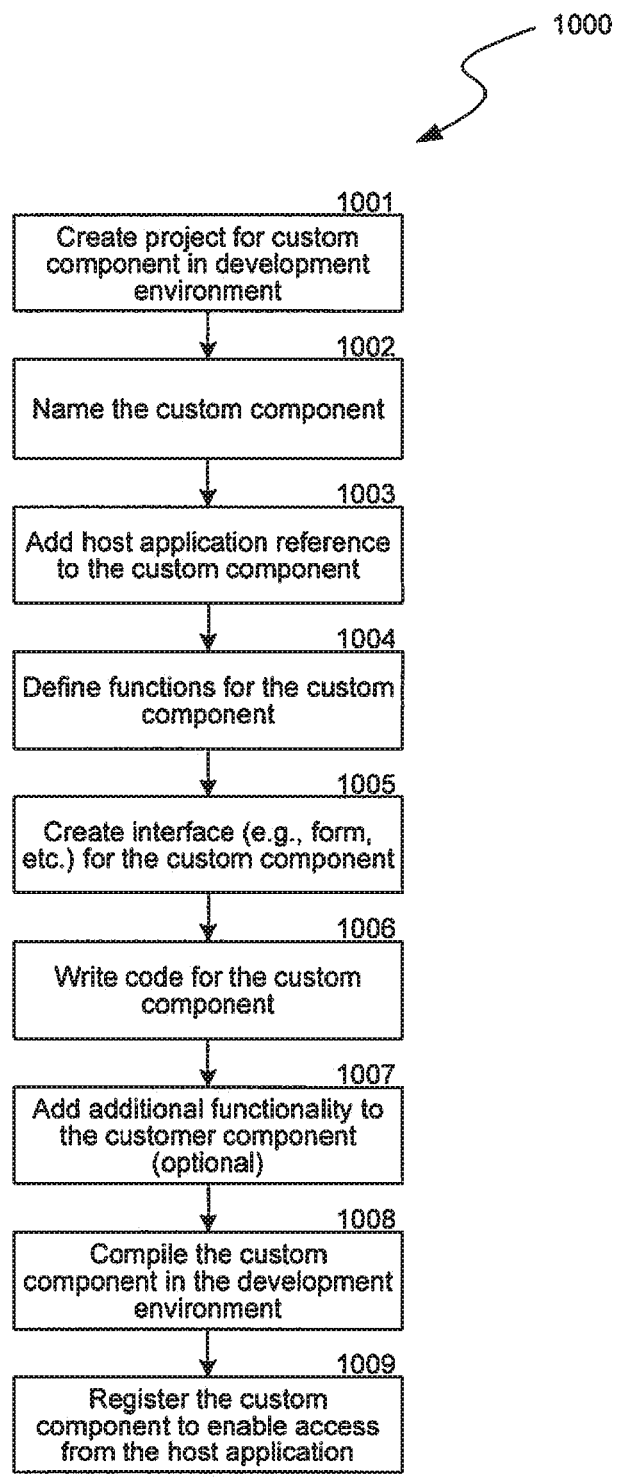
FIG. 10 is a flow diagram showing a more detailed example of a routine 1000 for creating and implementing a custom component in the host application of FIG. 1.

FIGS. 9 and 10 are representative flow diagrams that show processes that occur within the environment of FIG. 1. These flow diagrams do not show all functions or exchanges of data but, instead, provide an understanding of commands and data exchanged under the system. Those skilled in the relevant art will recognize that some functions or exchanges of commands and data may be repeated, varied, omitted, or supplemented, and other aspects not shown may be readily implemented.

Referring to FIG. 9, a routine 900 for developing and implementing a custom component (e.g., custom action) is shown. At block 901, the developer creates the code and interface for the custom component. At block 902 the developer modifies the custom component to satisfy template parameters such as those described in criteria provided by a host application. At block 903 the developer registers the custom component with the host application.

FIG. 10 shows a more detailed routine 1000 for creating and implementing a custom component. At block 1001, the developer creates a project for the custom component in a development environment such as the Microsoft Visual Studio .NET environment. At block 1002 the developer names the custom component. At block 1003 the developer adds the host application reference to the custom component. At block 1004 the developer defines functions (e.g., stub functions) for the custom component. At block 1005 the developer creates an interface (e.g., form, web form, etc.) for the custom component. At block 1006 the developer writes code for the custom component. This may include adding code to the defined functions of step 1004. At block 1007 the developer adds functionality to the custom component. This step is optional and it may involve the use of third party applications. At block 1008 the developer compiles the custom component in the development environment. At block 1009 the developer registers the custom component to enable access from the host application.

V. CONCLUSION

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively, where the context permits.

The teachings of the invention provided herein can be applied to other systems, not necessarily the system described herein. The elements and acts of the various embodiments described above can be combined to provide further embodiments.

This application is related to commonly owned U.S. patent application Ser. No. 10/938,118, filed Sep. 10, 2004, now U.S. Pat. No. 9,329,838, entitled "USER-FRIENDLY DATA BINDING, SUCH AS DRAG-AND-DROP DATA BINDING IN A WORKFLOW APPLICATION," which is incorporated by reference herein. Aspects of the invention can be modified, if necessary, to employ the systems, functions, and concepts of the reference described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. As noted above, particular terminology used when describing certain features or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed is:

1. A method for enhancing software products, the method comprising:
operating an integrated development environment (IDE) on a host computer, the IDE having a plurality of IDE views, the plurality of IDE views accessible by a user via a user interface of a software product running on the host computer, the software product accessible by client devices of end users over a computer network, the plurality of IDE views comprising a first IDE view;
receiving, by the host computer via the user interface of the software product running on the host computer, an indication from the user to customize the first IDE view;
responsive to the indication from the user to customize the first IDE view, displaying, by the host computer, a set of custom components on the user interface of the software product running on the host computer, the set of custom components registered in a data store associated with the software product running on the host computer, the data store comprising assemblies installed on the host computer to be shared among software products on the host computer; and
responsive to the user selecting and confirming a first custom component from the set of custom components displayed on the user interface of the software product running on the host computer, adding, by the host computer, a menu item to the first IDE view, the menu item corresponding to the first custom component, the first custom component accessible by the client devices of the end users of the software product running on the host computer over the computer network through the menu item added to the first IDE view.

2. The method according to claim 1, wherein the plurality of IDE views comprises at least one of a tool box view, a property view, or an action view.

3. The method according to claim 1, wherein the first IDE view comprises a tool box view, wherein the tool box view comprises a set of menu items, and wherein each menu item of the set of menu items in the tool box view corresponds to a specialized tool box.

4. The method according to claim 1, wherein the first IDE view comprises a first menu item and wherein the indication from the user to customize the first IDE view comprises a selection of the first menu item by the user via the user interface of the software product running on the host computer.

5. The method according to claim 1, wherein the first custom component comprises a custom action, wherein the custom action comprises a custom action user interface, and wherein the custom action user interface comprises one or more steps reusable by the end users of the software product.

6. The method according to claim 5, wherein the customer action is associated with an action view, wherein the action view comprises a pop-up menu, and wherein the pop-up menu is automatically displayed when the custom action is accessed via the menu item added to the first IDE view.

7. The method according to claim 1, wherein the software product comprises a workflow application, a graphics application, a word processing application, a data management application, or a drawing program.

8. A system for enhancing software products, the system comprising:
a host computer operating an integrated development environment (IDE), the IDE having a plurality of IDE views, the plurality of IDE views accessible by a user via a user interface of a software product running on the host computer, the software product accessible by client devices of end users over a computer network, the plurality of IDE views comprising a first IDE view, the host computer comprising:
at least one processor;
at least one non-transitory computer readable medium; and
stored instructions translatable by the at least one processor for:

receiving, via the user interface of the software product running on the host computer, an indication from the user to customize the first IDE view;

responsive to the indication from the user to customize the first IDE view, displaying a set of custom components on the user interface of the software product running on the host computer, the set of custom components registered in a data store associated with the software product running on the host computer, the data store comprising assemblies installed on the host computer to be shared among software products on the host computer; and responsive to the user selecting and confirming a first custom component from the set of custom components displayed on the user interface of the software product running on the host computer, adding a menu item to the first IDE view, the menu item corresponding to the first custom component, the first custom component accessible by the client devices of the end users of the software product running on the host computer over the computer network through the menu item added to the first IDE view.

9. The system of claim 8, wherein the plurality of IDE views comprises at least one of a tool box view, a property view, or an action view.

10. The system of claim 8, wherein the first IDE view comprises a tool box view, wherein the tool box view comprises a set of menu items, and wherein each menu item of the set of menu items in the tool box view corresponds to a specialized tool box.

11. The system of claim 8, wherein the first IDE view comprises a first menu item and wherein the indication from the user to customize the first IDE view comprises a selection of the first menu item by the user via the user interface of the software product running on the host computer.

12. The system of claim 8, wherein the first custom component comprises a custom action, wherein the custom action comprises a custom action user interface, and wherein the custom action user interface comprises one or more steps reusable by the end users of the software product.

13. The system of claim 12, wherein the customer action is associated with an action view, wherein the action view comprises a pop-up menu, and wherein the pop-up menu is automatically displayed when the custom action is accessed via the menu item added to the first IDE view.

14. The system of claim 8, wherein the software product comprises a workflow application, a graphics application, a word processing application, a data management application, or a drawing program.

15. A computer program product for enhancing software products, the computer program product comprising at least one non-transitory computer readable medium storing instructions translatable by at least one processor of a host computer for:

operating an integrated development environment (IDE) on the host computer, the IDE having a plurality of IDE views, the plurality of IDE views accessible by a user via a user interface of a software product running on the host computer, the software product accessible by client devices of end users over a computer network, the plurality of IDE views comprising a first IDE view;

receiving, via the user interlace of the software product running on the host computer, an indication from the user to customize the first IDE view;

responsive to the indication from the user to customize the first IDE view, displaying a set of custom components on the user interface of the software product running on the host computer, the set of custom components registered in a data store associated with the software product running on the host computer, the data store comprising assemblies installed on the host computer to be shared among software products on the host computer; and responsive to the user selecting and confirming a first custom component from the set of custom components displayed on the user interface of the software product running on the host computer, adding a menu item to the first IDE view, the menu item corresponding to the first custom component, the first custom component accessible by the client devices of the end users of the software product running on the host computer over the computer network through the menu item added to the first IDE view.

16. The computer program product of claim 15, wherein the first IDE view comprises a tool box view, wherein the tool box view comprises a set of menu items, and wherein each menu item of the set of menu items in the tool box view corresponds to a specialized tool box.

17. The computer program product of claim 15, wherein the first IDE view comprises a first menu item and wherein the indication from the user to customize the first IDE view comprises a selection of the first menu item by the user via the user interface of the software product running on the host computer.

18. The computer program product of claim 15, wherein the first custom component comprises a custom action, wherein the custom action comprises a custom action user interface, and wherein the custom action user interface comprises one or more steps reusable by the end users of the software product.

19. The computer program product of claim 18, wherein the customer action is associated with an action view, wherein the action view comprises a pop-up menu, and wherein the pop-up menu is automatically displayed when the custom action is accessed via the menu item added to the first IDE view.

20. The computer program product of claim 18, wherein the software product comprises a workflow application, a graphics application, a word processing application, a data management application, or a drawing program.

* * * * *